Figure 1:
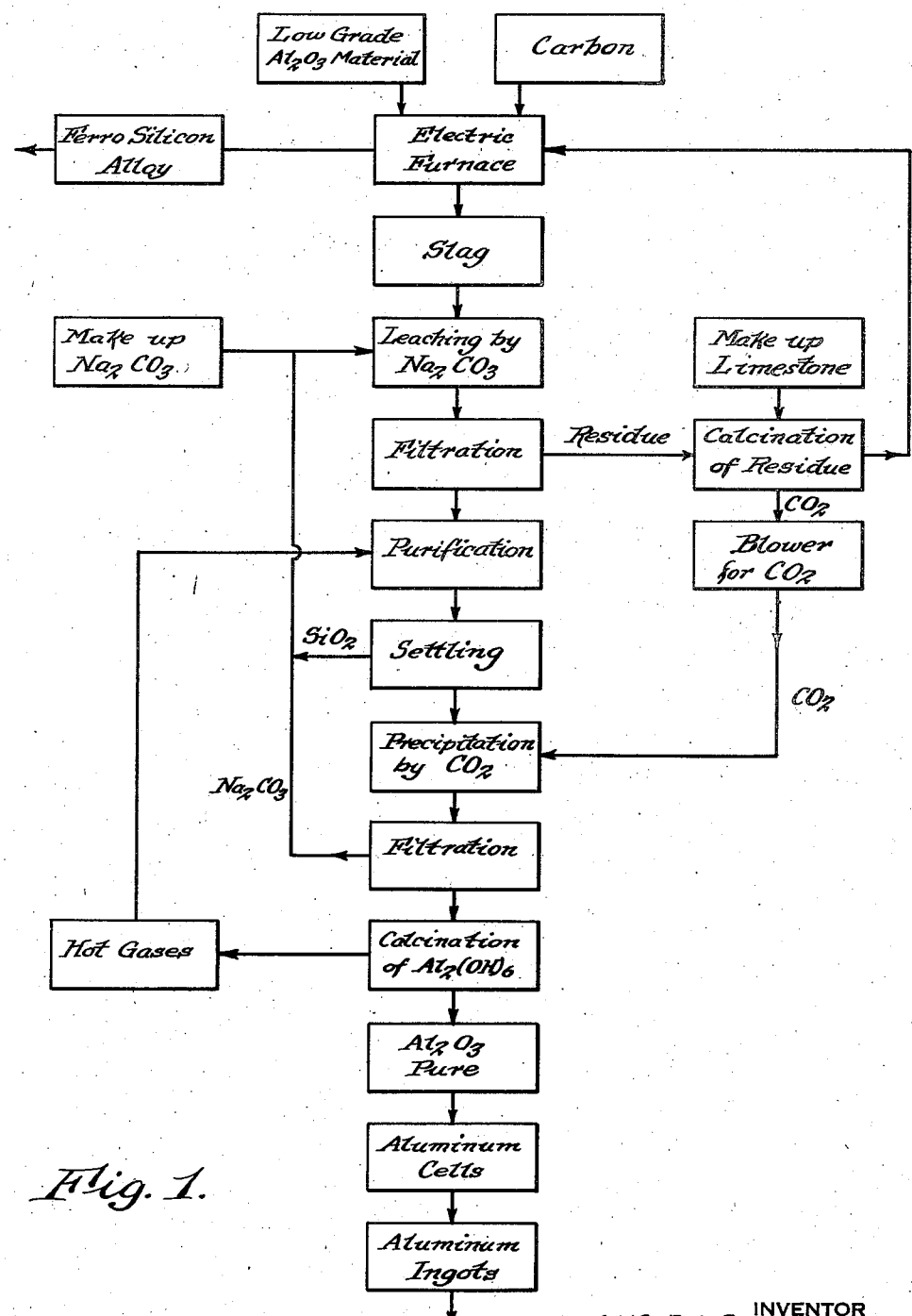

Sept. 24, 1946.   L. C. STURBELLE   2,408,241
PRODUCTION OF ALUMINUM
Filed Jan. 16, 1943   2 Sheets-Sheet 1

LUCIEN C. STURBELLE, INVENTOR
BY Parker Prochnow & Farmer
ATTORNEYS

Patented Sept. 24, 1946

2,408,241

UNITED STATES PATENT OFFICE 2,408,241

PRODUCTION OF ALUMINUM

Lucien C. Sturbelle, New York, N. Y.

Application January 16, 1943, Serial No. 472,586

5 Claims. (Cl. 23—141)

This invention relates to the production of metallic aluminum and particularly to the production of the same from low grade sources of raw material, such as bauxites, clays, and coal ashes. Metallic aluminum heretofore has been commonly obtained from sources of material which are not plentiful in this country, but which are relatively rich in alumina.

An object of this invention is to provide an improved, simple and inexpensive method of preparing metallic aluminum from low grade sources of raw material, which will require a minimum of outside energy and of additional reagents; with which the by-products will also be useful materials of commercial value, and which will require only relatively simple and inexpensive apparatus.

Another object of the invention is to provide an improved, simple and inexpensive process of obtaining aluminum oxide and aluminum hydroxide of relatively pure grades, which may be employed by any of the well-known processes for the production of metallic aluminum.

Other objects and advantages will be apparent from the following description of an example of the invention, and the novel features will be particularly pointed out hereinafter in connection with the appended claims.

Figure 2:
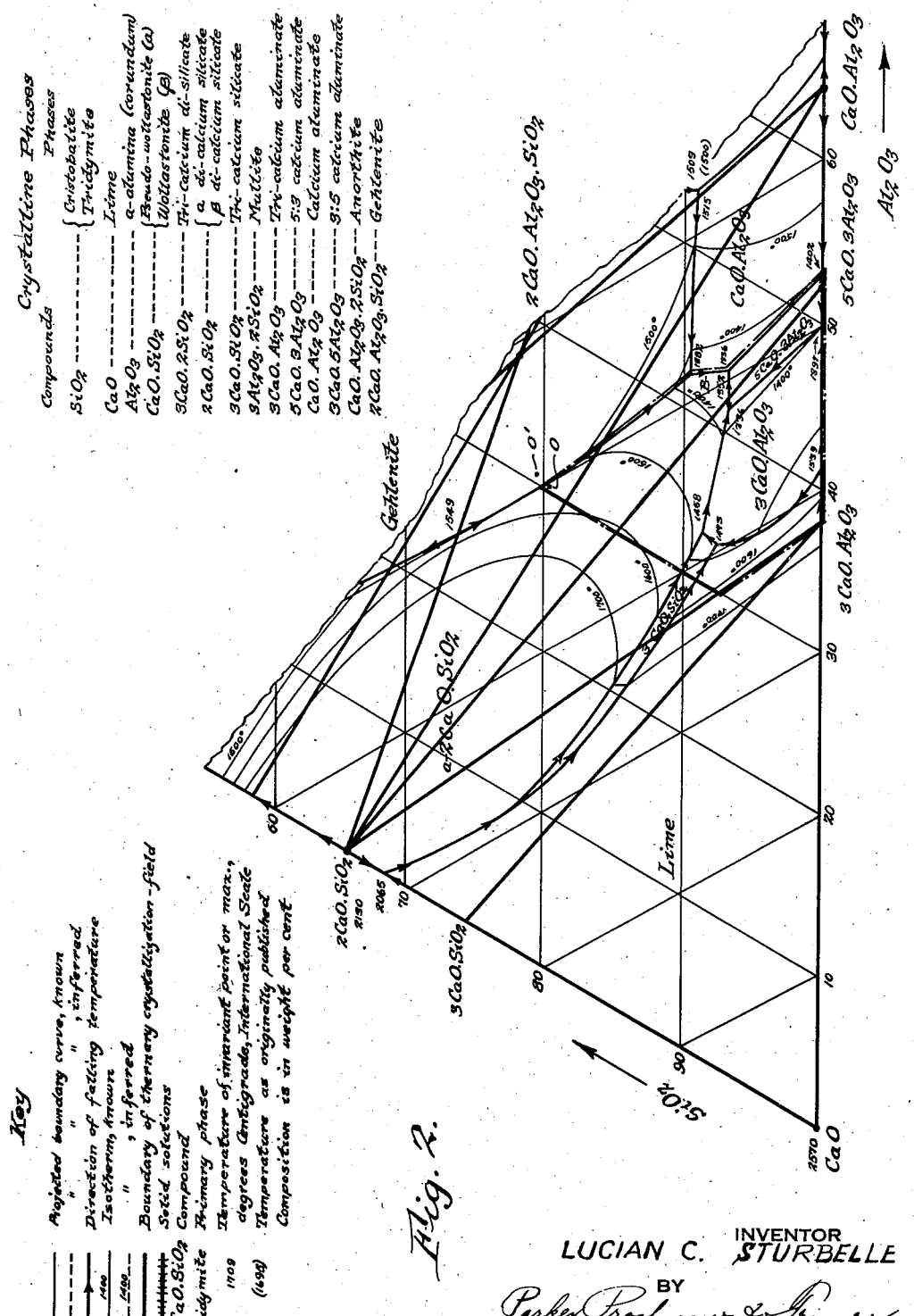

In the drawings:

Fig. 1 is a flow sheet illustrating the successive steps in one example of the process according to this invention; and Fig. 2 is a diagram of a portion of a phase equilibrium diagram of refractory oxides, which is advantageously employed in connection with this invention.

The diagram of Fig. 2 is known as a composition-temperature phase equilibrium diagram of the refractory oxides, which is published by the United States Steel Corporation, Research Laboratory, and identified as Plate 2. Similar diagrams have been published by other concerns covering approximately the same subject matter, and this diagram illustrates the characteristics and properties of compositions of the oxides of calcium, aluminum and silicon, and changes in such characteristics and properties which occur as relative proportions of the different components vary. Only that portion of the chart to which this invention relates has been illustrated.

Low grade bauxites are characterized by their low content of alumina, which is usually between 30% and 55% aluminum oxide, $Al_2O_3$, with a high content of silica or iron oxide, or both. Clays and ashes have a content of approximately 30% to 50% of $SiO_2$, 30% to 50% of $Al_2O_3$, the remaining content including $Fe_2O_3$, $TiO_2$, etc. This raw material (low grade bauxite, clay or ashes), according to this invention is mixed with a carboniferous material, such as coal, carbon, coke or charcoal, and with lime. The carboniferous material is used in an amount calculated to at least reduce the $SiO_2$, $Fe_2O_3$ and $TiO_2$ to the elements silicon, iron, and titanium respectively. The lime is used in an amount calculated to give a slag containing a substantial amount of calcium aluminate and preferably a composition falling within the area shown by the dot and dash lines in the phase equilibrium diagram of Fig. 2. When the lime is calculated to produce a slag that will fall within this selected area of the phase diagram, the slag so produced will disintegrate into a fine powder when the slag has been cooled, such as to about 96 degrees C. and is mainly a di-silicate of calcium and aluminum and a calcium aluminate. The proportion of lime can be easily precalculated by reference to said phase diagram, so as to produce a slag which will have these characteristics.

This mixture of the aluminum-containing material, the carboniferous material, and the lime is smelted, either continuously or in batches as desired, in a suitable furnace, and an electric furnace is very suitable for this purpose. When the mixture has been smelted, the result is a metal alloy and a slag, which are tapped from time to time from the bottom of the furnace into a tapping mold which is preferably conical in shape, the temperature of the smelted mass being approximately 1600 to 1800 degrees C. The mold with the tapped mixture of metal and slag therein is allowed to cool by itself, during which the slag stratifies separately from the metal alloy, and when the temperature reaches about 96 degrees C. this slag swells and disintegrates into a powder which is easily separated from the metal. The metal is largely a ferro-silicon alloy, plus impurities such as titanium, and the slag has an appearance very much like a basalt rock.

The metal alloy is marketable because it has usefulness in various industries and is not an economic loss. The slag is disintegrated into finely divided particles which are then leached with a sodium carbonate ($Na_2CO_3$) solution, which gives a solution of sodium aluminate and a precipitate of calcium carbonate. After the leaching has been completed, the solid residue is separated from the liquid in any suitable manner, such as by filtration. Preferably, the residue after separation of the liquid is washed in order to recover as much as possible of the excess of the sodium carbonate and of solutions of sodium aluminate which may adhere to the residue. While any suitable leaching, filtering and washing aparatus may, of course, be employed, one suitable for this purpose is disclosed in my copending application Ser. No. 331,265, filed April 23, 1940. The composition of the desired slag, as explained, is largely a di-silicate of calcium and aluminum and a calcium aluminate, and when such a powder is leached by the sodium carbonate, the reactions are as follows:

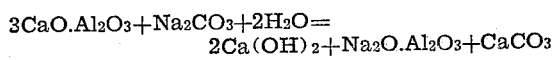

and

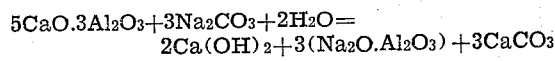

The residue from the leaching operation after it has been washed, as explained, is calcined, which converts it into carbon dioxide gas and a residue containing lime. The lime so formed is used in place of fresh lime for mixing with fresh aluminum bearing materials and carbon to provide fresh charges to be smelted, as above explained. The carbon dioxide gas is used in a later step of the process, which will be explained shortly.

The solution from the filtration operation may contain some silicious material which preferably should be removed. Therefore, this solution from the filtration operation is preferably heated to a temperature approximately from 100 to 125 degrees C. and with 29 to 34 pounds per square inch pressure, with the result that the silicious content is coagulated and settles. The mixture is then allowed to settle, and by adding to this settling mixture a small part of the cake remaining upon the filter in the preceding operation, the settling out is aided. It is difficult to filter out a gelatinous silica, and for that reason, the gelatinous material is settled out and with some of the solution is cycled or sent backwards to and mixed with the source of the sodium carbonate solution for the leaching operation. The clear liquid from the settling operation is then reacted upon with the carbon dioxide obtained from the calcination of the filtration residue. This reaction is as follows:

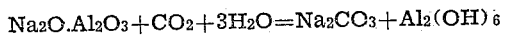

This precipitates aluminum hydroxide in relatively pure form in a solution of sodium carbonate.

This mixture, after this reaction, is then filtered to remove the sodium carbonate solution which is returned to the source of sodium carbonate used for the leaching operation, and since substantially all of the sodium carbonate is recovered and re-used for this purpose, it is only necessary to add a small amount of fresh sodium carbonate as a make-up solvent. Similarly the lime recovered by the calcination of the solids residue following the leaching is nearly sufficient to provide the lime required for treating a fresh quantity of raw material containing aluminum, and only a small amount of make-up lime need be added and that lime can be added as limestone to solids residue from the leaching step and calcined therewith. This separated precipitate of aluminum hydroxide is then calcined so as to convert it into a relatively pure aluminum oxide, $Al_2O_3$, which is then converted into metallic aluminum in any suitable manner, such as by an electrolytic aluminum cell, and the metallic aluminum may then be formed into suitable ingots for marketing.

During this calcination of the aluminum hydroxide, hot gases are driven off, and these gases may be used in the purification of the solution received from the leaching operation. Such gases do not enter into the chemical reaction, but are used to heat the leached liquid and coagulate the impurities therein, such as the silicious material. Thus very little, if any, heat is lost by such calcination of the aluminum hydroxide.

While the composition of the slag is preferably one which disintegrates upon cooling to facilitate its separation from the metal alloy, and be in easily leachable condition, a slag of modified composition, but containing calcium aluminate, may be reduced to powder form in any suitable manner, such as by atomizing it while fluid, or crushing it, but this entails additional operations and expense that can be avoided by selecting the proportion of lime to produce a slag that swells and disintegrates upon cooling. The lime should, therefore, preferably be calculated to give a slag that melts at a temperature not materially above approximately 1600 degrees C., contains not in excess of approximately 52% or less than approximately 30% of alumina, a silica content less than approximately 20% and a lime content of 47% to 70%. Such a slag on cooling should cause crystallization of one or more of tricalcium silicate, tricalcium aluminate, 5:3 calcium aluminate, calcium aluminate, and alpha and beta di-calcium silicate, which are crystals appearing within the area defined by the dot and dash line in the phase diagram of Fig. 2. A slag of this composition will disintegrate automatically as it cools, such as around 96 to 100 degrees C.

As an example of the use of such a phase diagram, let it be supposed that there is a slag of the following composition:

| | Per cent |
|---|---|
| $SiO_2$ | 20 |
| $Al_2O_3$ | 30 |
| $CaO$ | 50 |

This would locate the slag on the phase diagram (Fig. 2) at approximately the point "O." From the diagram and by reference, it will be observed that such a slag lies between the isotherms 1600 and 1500, so that the melting point will be about 1530 degrees C. If such a slag is tapped off at 1600 degrees C., it will be liquid and the elements are mixed together as a homogeneous solution, but when it cools, as soon as a temperature of about 1530 degrees C. is reached, some of the elements will begin to crystallize in accordance with well established laws shown by the diagrams, and the first crystals formed will be $2CaO.SiO_2$, because this compound has a melting point of 2130 degrees C. and this slag is located in the di-silicate zone. The equilibrium of the slag is destroyed, more crystals are formed, and a liquidus of a lower melting point is separated, the composition of the liquid part following the arrows on lines shown in the drawings. The separated crystals being mostly $2CaO.SiO_2$ with little $Al_2O_3$, the quantity of the latter in the liquidus increases. The eutectic of this zone has a melting point of about 1336 degrees C. and will freeze last, but because many crystals of di-silicate have been formed and the quantity of silica present is low, a large part of the alumina will crystallize as aluminate of calcium. When all of the slag is crystallized, one obtains a mixture of:

1. Crystals of $2CaO.SiO_2$
2. Eutectic containing $CaO.Al_2O_3.SiO_2$
3. Aluminate of calcium.

The first of these components of this crystallized mass has the property of swelling at about 96 degrees C., the second is insoluble in soda ash, or sodium carbonate, and the third is soluble in soda ash, giving a solution of sodium aluminate and a precipitate of carbonate of lime.

If now, for example, the lime is calculated to give a slag of nearly the same composition but situated at "O'" at the other side of the boundary line, the first crystals formed would be Gehlenite at 1596 degrees C., which is richer in $Al_2O_3$ than the slag. The remaining liquidus will increase in lime and the eutectic will melt at 1265 degrees C. with a composition of:

| | Percent |
|---|---|
| $Al_2O_3$ | 20 |
| $SiO_2$ | 40 |
| CaO | 38 |

This will give a separation of some lime and the whole product will be insoluble in sodium carbonate. Therefore, to get a leachable product, it is important to have the composition of the slag fall approximately within the area enclosed by the dot and dash lines, which is the boundary of the ternary crystallization field joining the point $2CaO.SiO_2$ to $5CaO.3Al_2O_3$ and to $CaO.Al_2O_3$. For practical reasons, it is better to avoid going over the 1600 degrees C. isotherm because that would give too high a melting point with too low a content of $Al_2O_3$ and too low a fluidity. In other words, the composition should preferably remain in the zone alpha $2CaO.SiO_2$ and within the limited area defined by the dot and dash lines.

To express the matter in a slightly different manner, the lime should be calculated to give a slag which has a composition varying from $3CaO.Al_2O_3$ to $5CaO.Al_2O_3$ with a silica component not greatly exceeding more than one mole.

It will be understood that various changes in the details and materials, as well as proportions, which have been herein described and illustrated in order to explain the nature of the invention, may be made by those skilled in the art within the principle and scope of the invention as expressed in the appended claims.

I claim as my invention:

1. In a process of producing alumina by fusion of low grade and silicious alumina-bearing material with carbon and lime and subsequent extraction of the alumina from the resulting slag by leaching with sodium carbonate, the steps comprising adding to the low grade alumina-bearing material enough carbon to convert iron and silicon contained therein to the metallic state with the formation of a ferrosilicon, and enough lime to form a slag separating on cooling from said ferrosilicon composed essentially of dicalcium silicate and calcium aluminate in which the ratio of lime to alumina is between three parts of lime to one of alumina and five parts of lime to three of alumina, heating the mixture to fusion and for a time sufficient to form said ferrosilicon and slag, cooling the mass to effect separation of the ferrosilicon from the slag, leaching the slag with a solution of sodium carbonate, thereby to extract substantially all of the alumina therein as sodium aluminate in solution and leave a residue composed essentially of dicalcium silicate and calcium carbonate, purifying the solution from colloidal silica contained therein, precipitating the alumina from the purified solution by adding thereto carbon dioxide and thereby regenerating sodium carbonate, returning the regenerated sodium carbonate solution to leach further quantities of slag, and recovering the precipitated alumina.

2. In the process set forth in claim 1, the further steps of calcining the residue of dicalcium silicate and calcium carbonate, utilizing the carbon dioxide resulting from such calcination as the source of carbon dioxide employed to precipitate the alumina, and returning the calcined solid residue to new batches of charging stock together with sufficient fresh lime and carbon to maintain the proportions stated for the formation of ferrosilicon and said slag.

3. In the process set forth in claim 1, the further steps of purifying the sodium aluminate solution obtained by leaching the slag by heating said solution to a temperature of from 120° to 125° C., and under a pressure of from 29 to 34 pounds per square inch, thereby to coagulate the silica therein, and separating the silica by settling.

4. In the process set forth in claim 1, the further steps of purifying the sodium aluminate solution obtained by leaching the slag which comprise heating said solution under pressure, adding to the solution a small part of the leached slag, and settling the separated silica and said leached slag.

5. In a process of producing metallic aluminum from low grade sources of alumina containing substantial amounts of silica, such as low grade bauxites, clays, and coal ashes, the steps of mixing the alumina bearing material from said sources with carboniferous material and lime, with the carboniferous material present in an amount approximately sufficient to reduce the silica, iron oxide and titanium oxide to silicon, iron and titanium and the formation of silicon alloys, and with the lime present in an amount sufficient to give, upon smelting of the mixture, a slag which contains calcium aluminate and dicalcium silicate and wherein the calcium aluminate is present as tricalcium aluminate and 5:3 calcium aluminate and mixtures thereof, said slag further being such as to disintegrate automatically upon cooling, smelting the mixture, cooling the same to effect a separation of the alloyed metals from the slag and the solidification of the slag with disintegration at low temperatures, leaching the disintegrated slag with a sodium carbonate solution to form a solution of sodium aluminate and a residue of dicalcium silicate and precipitated calcium carbonate, heating the liquid from the leaching step to coagulate the silicious content thereof, separating the coagulated silica by settling, treating the so purified liquid with carbon dioxide to precipitate aluminum hydroxide and form a solution of sodium carbonate, separating the aluminum hydroxide from said solution to form aluminum hydroxide with the liberation of hot gases, using the heat of said gases to heat the liquid from the leaching operation to effect the coagulation of the silicious content, calcining the residue of dicalcium silicate and calcium carbonate to release carbon dioxide and recover a lime-silica mixture, using the released carbon dioxide as the precipitant for the aluminum hydroxide, returning the lime-silica mixture to fresh charges of alumina bearing material together with such quantities of lime and carbon as are required to form the said alloys and slag, returning the solution of sodium carbonate regenerated by the precipitation of the aluminum hydroxide to the leaching step, and treating the precipitated aluminum hydroxide to recover aluminum therefrom.

LUCIEN C. STURBELLE.